United States Patent
Palsson

(10) Patent No.: US 11,015,867 B2
(45) Date of Patent: *May 25, 2021

(54) COMBINED COOKER AND DRYER DEVICE

(71) Applicant: HEDINN HF., Hafnarfjordur (IS)

(72) Inventor: Gunnar Palsson, Reykjavik (IS)

(73) Assignee: HEDINN HF., Hafnarfjordur (IS)

( * ) Notice: Subject to any disclaimer, the term of this patent is extended or adjusted under 35 U.S.C. 154(b) by 67 days.

This patent is subject to a terminal disclaimer.

(21) Appl. No.: 16/347,118

(22) PCT Filed: Nov. 2, 2017

(86) PCT No.: PCT/IS2017/050014
§ 371 (c)(1),
(2) Date: May 2, 2019

(87) PCT Pub. No.: WO2018/083717
PCT Pub. Date: May 11, 2018

(65) Prior Publication Data
US 2020/0064066 A1    Feb. 27, 2020

(30) Foreign Application Priority Data
Nov. 2, 2016 (IS) .......................... 050165

(51) Int. Cl.
*F26B 3/24* (2006.01)
*F26B 11/16* (2006.01)
(Continued)

(52) U.S. Cl.
CPC ................ *F26B 3/24* (2013.01); *F26B 11/16* (2013.01); *F26B 17/24* (2013.01); *F26B 17/28* (2013.01); *F26B 23/002* (2013.01)

(58) Field of Classification Search
CPC .. F26B 3/24; F26B 25/04; F26B 11/16; F26B 17/205

See application file for complete search history.

(56) References Cited

U.S. PATENT DOCUMENTS 3,687,422 A * 8/1972 List .......................... B01F 7/042
366/289
4,058,907 A * 11/1977 Lipp ..................... B01F 15/066
34/61

(Continued)

FOREIGN PATENT DOCUMENTS

CN    2039402 U    6/1989
CN    2147485 Y    11/1993
(Continued)

OTHER PUBLICATIONS

International Search Report and Written Opinion issued in PCT/IS2017/050014 dated Jan. 12, 2018.

(Continued)

*Primary Examiner* — David J Laux
(74) *Attorney, Agent, or Firm* — Heslin Rothenberg Farley & Mesiti P.C.

(57) ABSTRACT

The present invention relates to combined cooker and dryer apparatus to use for drying material, such as raw material for producing fish or meat meal. The device of the present invention provides a cooker and a dryer apparatus with disks and scrapers for heat exchange and evaporation of the water phase from any material.

7 Claims, 3 Drawing Sheets

---- Steam

(51) Int. Cl.
*F26B 17/24* (2006.01)
*F26B 17/28* (2006.01)
*F26B 23/00* (2006.01)

(56) References Cited

U.S. PATENT DOCUMENTS

| | | | | |
|---|---|---|---|---|
| 4,276,701 | A | * | 7/1981 | Takacs ................ C07D 239/92 34/109 |
| 4,279,295 | A | * | 7/1981 | Duckworth ............ A23G 1/18 165/94 |
| 4,335,146 | A | * | 6/1982 | Bladh ................... A23J 1/04 426/231 |
| 4,581,829 | A | * | 4/1986 | Becker .................. F26B 11/16 34/402 |
| RE33,580 | E | * | 4/1991 | Fraioli .................... A23B 4/01 126/92 AC |
| 5,197,205 | A | * | 3/1993 | Spada ................... F26B 17/20 34/135 |
| 5,660,124 | A | * | 8/1997 | Doncer .................. F26B 17/02 110/227 |
| 6,061,924 | A | * | 5/2000 | Bolton ................... F26B 11/16 165/92 |
| 8,365,433 | B2 | * | 2/2013 | Ogura ...................... F26B 5/04 34/339 |
| 8,561,314 | B2 | * | 10/2013 | Kruger ................. F26B 25/006 34/92 |
| 10,247,476 | B2 | * | 4/2019 | Lim ...................... F26B 25/005 |
| 10,527,349 | B2 | * | 1/2020 | Palsson ................... F26B 23/10 |
| 10,782,067 | B2 | * | 9/2020 | Palsson .................... F26B 3/24 |
| 2019/0254472 | A1 | * | 8/2019 | Palson .................... F26B 21/10 |

FOREIGN PATENT DOCUMENTS

| | | | |
|---|---|---|---|
| CN | 203884622 U | 10/2014 | |
| EP | 0381569 A1 * | 8/1990 | ............. F26B 11/16 |
| FR | 2712076 A1 | 5/1995 | |
| JP | 2010236731 A | 10/2010 | |
| WO | 2015189864 A1 | 12/2015 | |
| WO | 2017138025 A1 | 8/2017 | |

OTHER PUBLICATIONS

Danish Patent and Trademark Office Search Report dated Mar. 10, 2017.

* cited by examiner

COMBINED COOKER AND DRYER DEVICE

CROSS REFERENCE TO RELATED APPLICATIONS

This application is a U.S. National Phase filing under 35 U.S.C. § 371 of International Application PCT/IS2017/050014, filed Nov. 2, 2017, and published as WO 2018/083717 A1 on May 11, 2018. PCT/IS2017/050014 claims priority from Iceland application number 050165, filed Nov. 2, 2016. The entire contents of each of these prior applications are hereby incorporated herein by reference.

FIELD OF INVENTION

The present invention relates to a new device for cooking and drying material, such as organic material. More specifically the present invention relates to a cooker and a dryer apparatus with disks and scrapers for heat exchange and evaporation of the water phase from any material.

INTRODUCTION

Cookers and dryers used in the meal industry are usually circular or semi-circular chambers with heat exchange elements arranged around their surface. Some devices have a disk set-up, where parallel arranged disks on an axis are used to facilitate the heat exchange and rotating scrapers fluff the material and move it along the chamber. Prior art cookers normally comprise either of a steam cooker of screw type, a Contherm-type or a tubular heater. A steam cooker is generally designed as a cylinder having a steam heated jacket throughout and a steam heated rotor, designed as a screw conveyor with hollow flights. Material sticking to heat exchange surfaces makes control of cooking problematic. A Contherm heater consists of a vertical cylindrical heat exchanger provided with an agitator keeping the material in rapid movement, thus contributing to effective heat transfer. During rotation, the agitator blades (knives) are pressed against the surrounding heating surface in order to prevent the formation of material on the surface. These devices need to be cleaned very frequently, which is time consuming and prevents continuous use. The problems with such device are insufficient scraping to prevent material build-up on the heating surface and material can burn thereon. Furthermore, it tends to be structurally heavy and expensive with a high resistance to rotation necessary for this application.

Today, small factories are available for cooking and drying organic material to have on site next to a fish processing factory or on board a fishing vessel.

FR2712076 discloses a dryer for wet products comprising a row of parallel hollow circular discs spaced along the length of a chamber. The discs are fixed to the walls of the chamber and a heat-exchange fluid flows through these discs during the drying process. Plates, which are fixed to a rotating shaft containing scrapers for scraping the surfaces of the discs are arranged between the discs.

SUMMARY OF THE INVENTION

Removal of the water phase from material, such as organic material in the production of high quality low-heat generated meal, is usually done by an evaporation process. The present invention provides a new device for both cooking and drying any material having a water phase.

It is an advantage that the apparatus of the present invention that a combined cooker and dryer is both cost effective and provides a simplified assembly of a meal factory. The device of the present invention is specifically advantageous in a smaller factories.

It is an object of the present invention to overcome or ameliorate the aforementioned drawbacks of the prior art and to provide an improved and/or alternative and/or additional device for heating/cooking or removing a water phase from material. It is one preferred object of the present invention to provide a combined cooker and dryer device arranged as a chamber with an upper portion and a semi-cylindrical lower portion heat exchange elements for conducting heat to the chamber and scrapers rotating on a centrally arranged axis/shaft between the cylindrical or semi-cylindrical disc-shaped hollow compartments. Moreover, it is a preferred object of the present invention to provide an arrangement where the heat exchange elements of the cooker section and the dryer section are separated by an intermittent section, either for feeding the material to an oil phase separation device or to feed the material into the dryer section.

The object(s) underlying the present invention is (are) particularly solved by the features defined in the independent claims. The dependent claims relate to preferred embodiments of the present invention. Further additional and/or alternative aspects are discussed below.

Thus, at least one of the preferred objects of the present invention is solved by an apparatus, which is combined cooker and dryer for heating and removing a water phase from material. The apparatus comprises a chamber having a cooker section, a dryer section. The cooker section is separated from the dryer section with a water tight panel attached to the interior of the chamber. The chamber has a lower portion with a cylindrical or semi-shape and an upper portion closing the chamber. The combined cooker and dryer device has an inlet at the beginning of the cooker section and an outlet at the end of the dryer section. The cooker section and the dryer section each have heat exchange elements comprising i) a jacket arranged around the chamber, and ii) a plurality of cylindrical or semi-cylindrical disc-shaped hollow compartments arranged parallel with space between them in the lower portion of the chamber. Each cylindrical or semi-cylindrical disc-shaped hollow compartment comprising hollow protrusions connecting the disc-shaped hollow compartments to the jacket through connection openings. The device further comprises an axis arranged centrally within the container and scrapers attached to, and rotating on the centrally arranged axis between the cylindrical or semi-cylindrical disc-shaped hollow compartments. As a part of the heat exchange system, the combined cooker and dryer also comprises i) a first duct leading to the jacket of the dryer section for feeding steam under pressure from a steam boiler into the heat exchange elements of the dryer section and ii) a second duct leading from the upper portion of the dryer section to the jacket of the cooker section for feeding steam generated in the dryer section into the heat exchange elements of the cooker.

In the present context the terms "semi-cylindrical disc-shaped hollow compartments" and "discs" refers to the same item, namely the discs that are inserted into the container. The disks are not fully cylindrical as they contain connection members to connect to the jacket and a recess for receiving the axle rotating the scrapers. The discs may also have a relatively flat upper side.

In the present context the terms "heat exchange unit" and "heat exchange elements" refer to a set of disc-shaped hollow compartments and the respective jacket which the set of discs is connected to for a certain portion of a chamber.

In the present context, the bottom portion of the container is cylindrical so that the scrapers, which are arranged on the rotating shaft, can scrape the inner side of the container as well as the discs. The upper portion may have any shape such as, but not limited to oval, cylindrical, square (as shown in the drawings) etc. as long as it does allow room the scrapers to rotate a whole circle around the axis. The upper portion forms an upper chamber to "loft" the stirred material and to collect the vapour or steam as a result of the heat exchange process.

In the present context the terms "axis" and "shaft" relate to a centrally arranged shaft which rotates around an axis in the chamber of the device of the invention.

In an embodiment of the present invention the chamber further comprises an intermittent section between the cooker section and the dryer section.

In an embodiment of the present invention the intermittent section is separated from the cooker section and the dryer section with a water tight panels attached to the interior of the chamber.

In an embodiment of the present invention the water tight panel separating the pre-dryer from the cooker and/or the intermittent section extends to around the height of the disc-shaped hollow compartment, but the water tight panel may also extend to the top of the chamber.

In an embodiment of the present invention the last scraper of the cooker section comprises scooping means for scooping material between the last cylindrical or semi-cylindrical disc-shaped hollow compartment and the panel over to the intermittent section or the dryer section.

In an embodiment of the present invention an outlet at the end of the cooker section or in the intermittent section is connected to a pump for pumping the material into a separation device for separating the oil phase from the material.

In an embodiment of the present invention the chamber has an inlet in the drying section for receiving material from the separation device.

In an embodiment of the present invention a sensor monitors the amount of material in the dryer section by measuring the height or level of material in the dryer section.

In an embodiment of the present invention a sensor monitors the amount of material in the combined cooker and dryer device by measuring the weight of material in the chamber.

In an embodiment of the present invention a scooping device is attached to the axis in the intermittent section to transfer the material from the intermittent section to the dryer section.

In an embodiment of the present invention the apparatus further comprises a secondary dryer for removing more of the water phase from the material and transport means for providing a flow of material from the dryer section of the device to the secondary dryer. In such an embodiment a duct from the jacket of the dryer section also leads to the jacket of the secondary dryer for feeding steam generated in the dryer section into the heat exchange elements of the secondary dryer.

In an embodiment of the present invention a sensor monitors the amount of material in the dryer section by measuring the level of the material in the dryer section.

In an embodiment of the present invention an outlet in the intermittent section is connected to a pump for pumping the material into a separation device for separating the oil phase from the material.

In an embodiment of the present invention the chamber has an inlet in the drying section for receiving material from the separation device.

In an embodiment of the present invention the pressure in the jacket of the dryer section is between 101 and 125° C.

In an embodiment of the present invention the pressure and the temperature of the steam in the upper portion of the combined dryer and cooker is at or just above 100° C. at a 0-20 mbar pressure.

In an embodiment of the present invention the dryer section has a first jacket and a second jacket parallel arranged around the chamber, where the first jacket receives steam under pressure from a steam boiler. In this embodiment the apparatus further comprises a duct leading from the upper portion of the dryer section into the second jacket of the dryer section and one or more high pressure fans in the duct between the upper portion of the dryer section and the second jacket of the dryer section for increasing the pressure and the temperature of the steam before injecting it into the second jacket of the dryer section. In the present context such an arrangement with a pressure pump is referred to as an MVR dryer unit.

In an embodiment of the present invention the amount of material in the combined cooker and dryer is monitored by weight.

In an embodiment of the present invention an oil phase is separated from the material in a separating device after heating the material in the cooker and prior to transferring it into the dryer section.

In an embodiment of the present invention scrapers are attached to, and rotating on, the centrally arranged axis the intermittent section.

In an embodiment of the present invention the scrapers comprise a rotating member and a scraping member, where the scraping member scrapes the surface of the discs as well as the inner surface of the lower portion of the chamber. In a further embodiment of the present invention the scraping member is attached to the rotating member by a pushing member which pushes the scraping member up against the surface of the discs. Such a pushing member is selected from, but not limited to a spring element.

In an embodiment of the present invention the panels are attached to the interior surface of the chamber by welding or bolting.

An alternative embodiment provides a combined cooker and dryer for heating and removing a water phase from material comprising a chamber having cooker section, a dryer section and an intermittent section, where the dryer section is separated from the intermittent section with a water tight panel. In this embodiment the cooker section is only separated from the intermittent section by the last disk in the cooker section. The chamber has a lower portion with a cylindrical or semi-cylindrical shape and an upper portion closing the chamber, an inlet and an outlet. The cooker section and the dryer section each comprise heat exchange elements formed by a jacket arranged around the chamber and a plurality of cylindrical or semi-cylindrical disc-shaped hollow compartments, arranged parallel with space between them in the lower portion of the chamber. Each cylindrical or semi-cylindrical disc-shaped hollow compartment has hollow protrusions connecting the disc-shaped hollow compartments to the jacket through connection openings. The device further comprises an axis arranged centrally within the container and scrapers attached to, and rotating on the centrally arranged axis between the cylindrical or semi-cylindrical disc-shaped hollow compartments. The steam for the heat is arranged such that a first duct leading to the jacket of the dryer section for feeding steam under pressure from a steam boiler into the heat exchange elements of the dryer section, and a second duct leading from the upper portion of the dryer section to the jacket of the cooker section for feeding steam generated in the first dryer into the heat exchange elements of the cooker.

Alternatively or additionally the present invention provides a combined cooker and dryer for heating and removing a water phase from material. The apparatus comprises a chamber, said chamber having a lower portion with a cylindrical or semi-shape and an upper portion closing the chamber. The chamber further comprises i) an inlet, ii) an outlet, iii) heat exchange elements, further comprising a) a jacket arranged around each section, and a plurality of cylindrical or semi-cylindrical disc-shaped hollow compartments, arranged parallel with space between them in the lower portion of the chamber, each cylindrical or semi-cylindrical disc-shaped hollow compartment comprising hollow protrusions connecting the disc-shaped hollow compartments to the jacket through connection openings. The combined cooker and dryer further comprises iv) an axis arranged centrally within the container, and scrapers attached to, and rotating on the centrally arranged axis between the cylindrical or semi-cylindrical disc-shaped hollow compartments. The new combined cooker and dryer device is characterised in that the chamber is divided into a cooker section and a dryer section, where the cooker section is separated from the dryer section with a water tight panel attached to the interior of the chamber. The chamber of the device of the invention further comprises v) a first duct leading to the jacket of the dryer section for feeding steam under pressure from a steam boiler into the heat exchange elements of the dryer section, and vi) a second duct leading from the upper portion of the chamber to the jacket of the cooker section for feeding steam generated in the dryer section into the heat exchange elements of the cooker.

Alternatively or additionally the present invention provides a combined cooker and dryer for heating and removing a water phase from material. The apparatus comprises a chamber, said chamber having a lower portion with a cylindrical or semi-shape and an upper portion closing the chamber. The chamber further comprises i) an inlet, ii) an outlet, iii) heat exchange elements, further comprising a) a jacket arranged around each section, and a plurality of cylindrical or semi-cylindrical disc-shaped hollow compartments, arranged parallel with space between them in the lower portion of the chamber, each cylindrical or semi-cylindrical disc-shaped hollow compartment comprising hollow protrusions connecting the disc-shaped hollow compartments to the jacket through connection openings. The combined cooker and dryer further comprises iv) an axis arranged centrally within the container, and scrapers attached to, and rotating on the centrally arranged axis between the cylindrical or semi-cylindrical disc-shaped hollow compartments. The new combined cooker and dryer device is characterised in that the chamber is divided into a cooker section, a dryer section and an intermittent section between the cooker section and the dryer section, where the cooker section is separated from the dryer section with a water tight panel attached to the interior of the chamber. The chamber of the device of the invention further comprises v) a first duct leading to the jacket of the dryer section for feeding steam under pressure from a steam boiler into the heat exchange elements of the dryer section, and vi) a second duct leading from the upper portion of the chamber to the jacket of the cooker section for feeding steam generated in the dryer section into the heat exchange elements of the cooker.

BRIEF DESCRIPTION OF DRAWINGS

The present invention will be further described with reference to the drawings using reference numbers in the drawings to identify the individual components of the invention.

DETAILED DESCRIPTION OF THE PRESENT INVENTION

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

Figure 1:
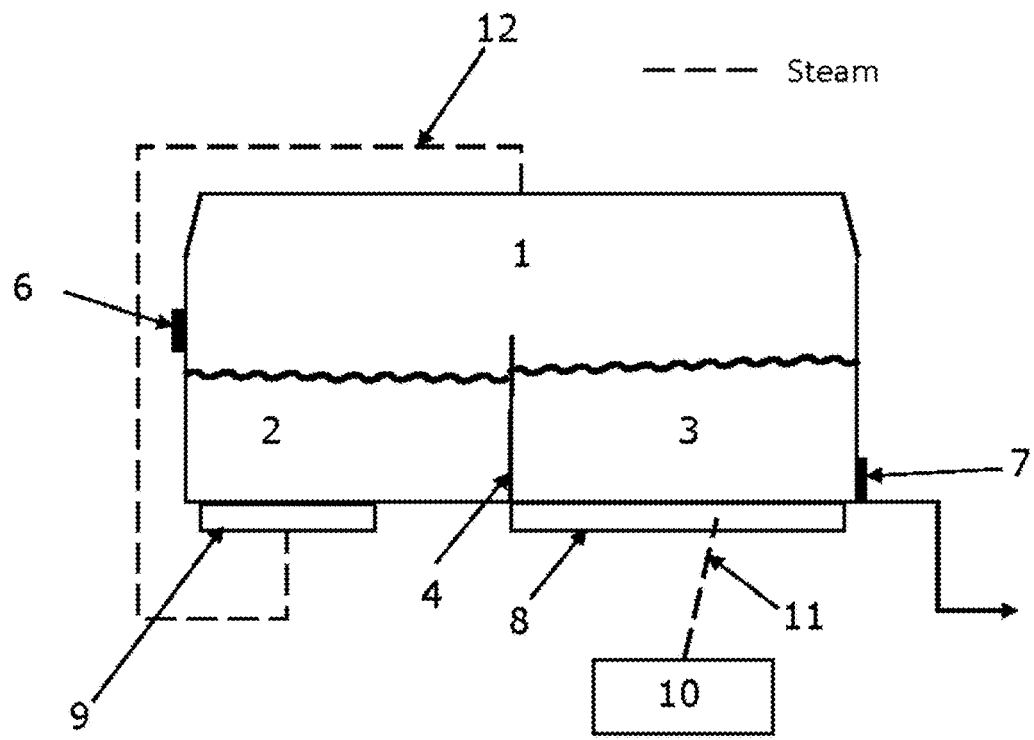
FIG. 1 shows a schematic drawing of a combined cooker and dryer device of the present invention.

FIG. 1 shows a schematic drawing of a device for cooking and drying material. The figure shows a combined cooker and dryer device according to claim 1, where the cooker and the dryer are arranged within the same chamber 1. The cooker section 2 and the dryer section 3 are separated by a panel 4 attached to the interior surface of the chamber 1. The material in the cooker section 2 is transferred to the intermittent section 5 by means of an overflow or a scooping device attached to a scraper between the last two hollow discs of the cooker section (not shown). The heat exchange elements for conducting heat to the combined cooker and dryer device comprises jackets 8, 9 for each section arranged around the chamber and connected to hollow discs (not shown in this drawing) in the chamber. The heat exchange system uses steam generated in a steam boiler 10 and feeds steam under pressure from the steam boiler 10 into the jacket 8 arranged around the dryer section of the combined device via a duct 11. A duct 12 leading from the upper portion of the chamber of the combined device into the jacket of the cooker section 9 is used for leading steam generated in the dryer section into the heat exchange elements of the cooker section.

Figure 2:
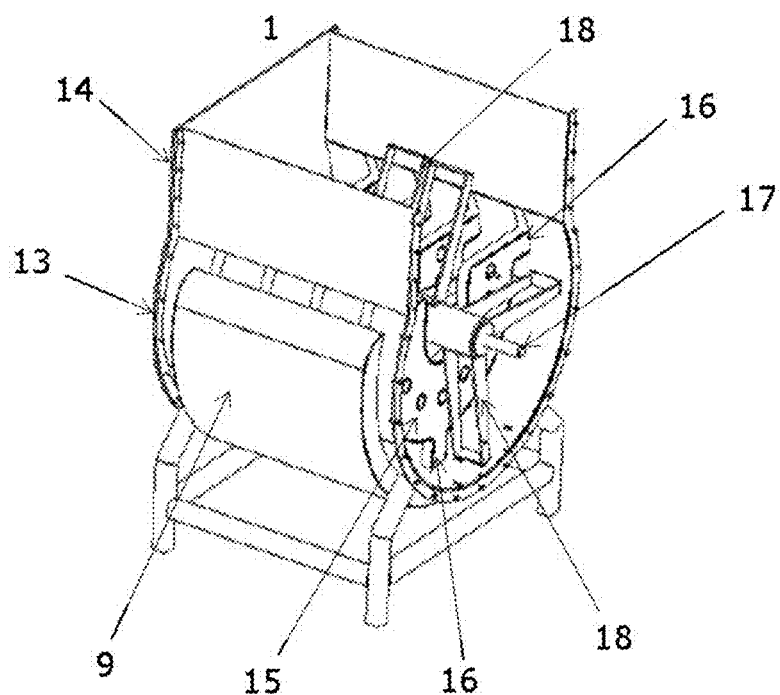
FIG. 2 shows the construction of a cooker section of the device of the present invention.

FIG. 2 shows the construction of a cooker section of the device of the present invention. The chamber 1 of the device has a lower portion 13 with a cylindrical or semi-cylindrical shape and an upper portion 14 for receiving steam from the lower portion. The upper portion 14 of the chamber has a rectangular shape and sits on top of the lower semi-cylindrical chamber 13. Disc-shaped hollow compartments 15 are shown parallel arranged with space between them in the lower semi-cylindrical chamber 1, having a connection portion 16 on each side of the upper side of the disc and one at the bottom, where each connection portion 16 connects to the jacket 9 through openings in the lower semi-cylindrical chamber 1. An axis 17 arranged along the chamber rotates the scrapers 18.

Figure 3:
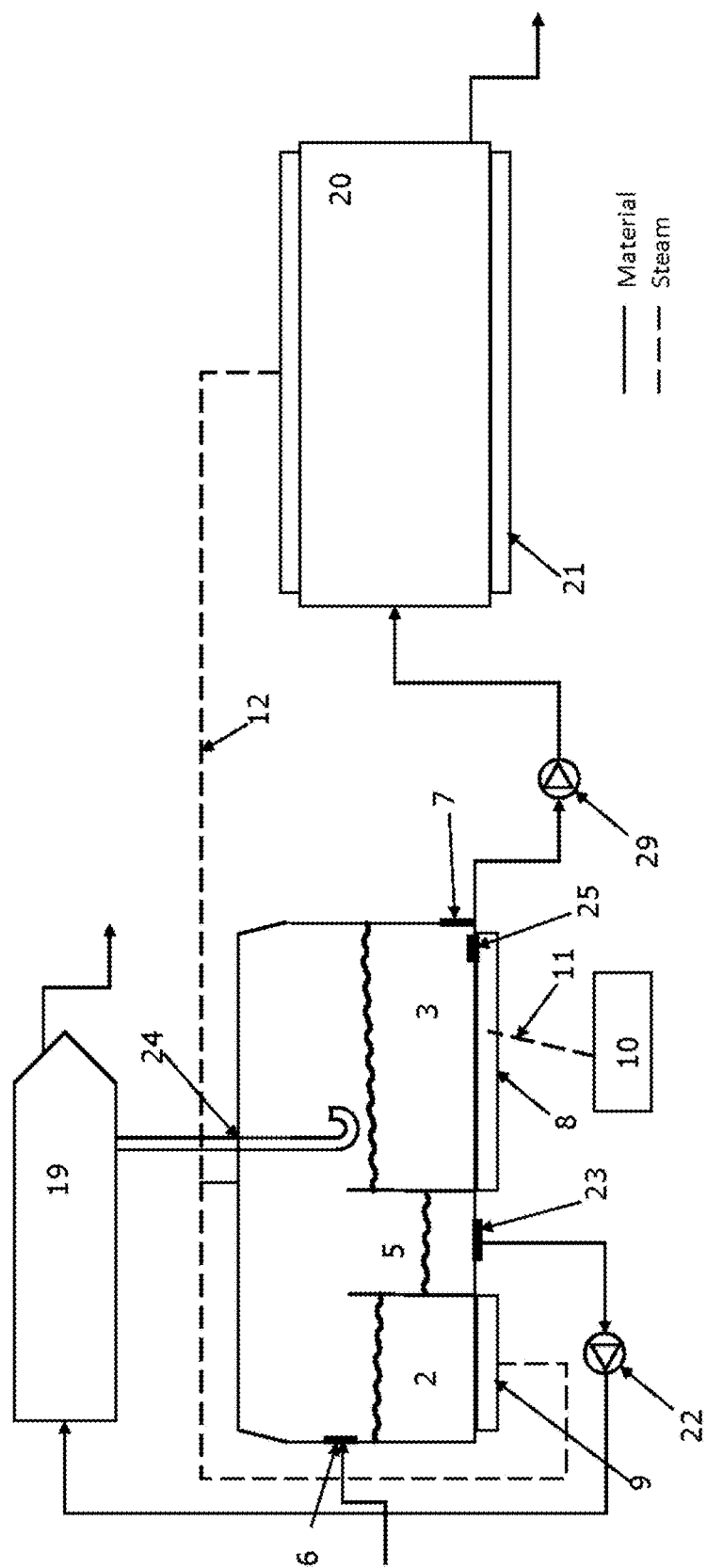
FIG. 3 shows a schematic drawing of system for recovery of meal and oil from raw material showing the route of the material and the input and distribution of heating media through the system.

FIG. 3 shows a schematic drawing of system for recovery of fish meal and oil from fish raw material similar to FIG. 1 where the route of the material through the system and the input and distribution of heating media through the system is shown. The cooker and the dryer are arranged within the same chamber 1, where the cooker section 2 and the dryer section 3 are separated by a panel 4 attached to the interior surface of the chamber 1. An intermittent section 5 is formed in the space between the cooker section 2 and the dryer section 3, separated by panels 4 attached to the interior surface of the chamber.

The drawing shows the device of the present invention implemented in a fish meal factory together with a separation device 19 for separating the oil phase from the rest of the material and a secondary dryer 20 to remove more of the water phase from the material. The material is feed to the cooker section through the inlet 6. The heat exchange system of the device uses steam generated in a steam boiler 10 and feeds steam under pressure from the steam boiler 10 into the jacket of the dryer section 8 via a duct 11. A duct 12 leading from the upper portion of the chamber of the dryer section 3 of the device to the jacket of the cooker 9 and to the jacket of the secondary dryer 21 is used for leading steam generated in the dryer section into the heat exchange elements of the cooker and the secondary dryer 20. The separation device 19 for separating the oil phase from the material as shown in this drawing. A pump 22 is used for pumping the material from an outlet 23 the intermittent section 5 into a separation device 19 for separating the oil phase from the material. After separation of oil from the material, the remaining phase is feed back into the dryer device through an opening 24 and into the dryer section. A pump 29 transfers the material into the secondary dryer from the outlet 7 of the dryer section of the combined device of the present invention. The combined device is arranged on weight cells 25 in this embodiment for monitoring the amount of material in device.

Figure 4:
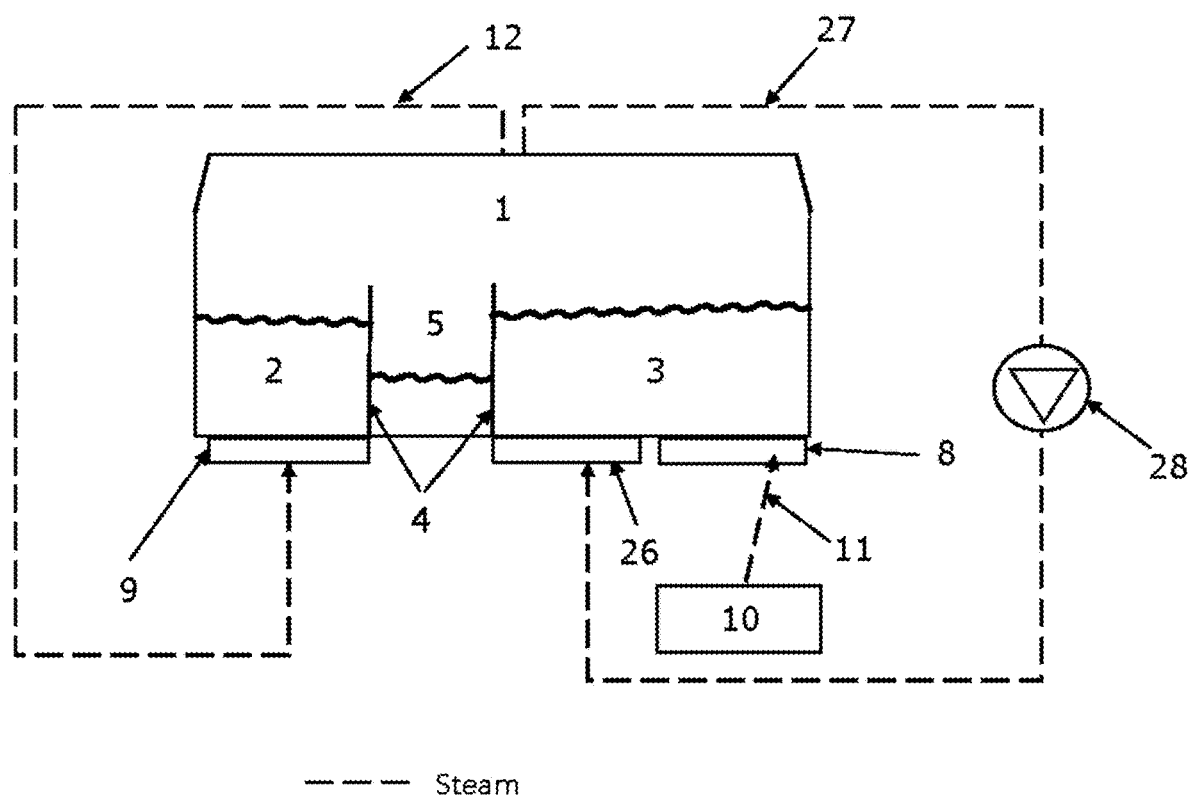
FIG. 4 shows an embodiment according to claims 1 and 8 of the present invention using the MVR technology for one of the heat exchange units

FIG. 4 shows an embodiment according to claims 1, 2 and 8 of the present invention, where the cooker and the dryer are housed in the same chamber.

The apparatus shown in FIG. 6 has three jackets arranged around the chamber and a plurality of semi-cylindrical disc-shaped hollow compartments (not shown), where a set of disc-shaped hollow compartments 26 is connected to their respective jacket 8, 9, 26 to form a heat exchange unit or the heat exchange elements for that portion of the chamber. The semi-cylindrical disc-shaped hollow compartments are divided into three sets of disks, where one set provides a heat exchange unit to the cooker and two sets provide a heat exchange unit to the dryer section. In this embodiment a jacket 9 is arranged around the cooker section 2, where steam from the upper portion of the chamber feeds steam to the heat exchange elements/unit of the cooker through the duct 12. The dryer portion has two heat exchange units with a first jacket 8 arranged around the chamber at one end and a second jacket 26 arranged around the middle portion of the chamber as well as their corresponding semi-cylindrical disc-shaped hollow compartments. The first jacket 8 arranged around the dryer section 3 is connected to a duct 11 for feeding steam under pressure form a boiler 10 into the first jacket 8. The second jacket 26 arranged around the dryer section 3 is connected to a steam duct 27 leading from the upper portion of the chamber into the first jacket 26 with a high pressure fan 28 arranged in the duct 27 for increasing the pressure and the temperature of the steam taken from the upper portion before injecting it into the respective disc-shaped hollow compartments.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A combined cooker and dryer for heating and removing a water phase from material, the combined cooker and dryer comprising:
   a chamber, said chamber further comprising:
      cooker section,
      a dryer section, and
      said chamber having a lower portion with a cylindrical or semi-shape and an upper portion closing the chamber, said chamber further comprising:
      an inlet,
      an outlet,
   wherein the cooker section and the dryer section each comprise heat exchange elements, said heat exchange elements comprising:

a jacket arranged around each section, and a plurality of cylindrical or semi-cylindrical disc-shaped hollow compartments, arranged parallel with space between them in the lower portion of the chamber, each cylindrical or semi-cylindrical disc-shaped hollow compartment comprising hollow protrusions connecting the disc-shaped hollow compartments to the jacket through connection openings, wherein the combined cooker and dryer further comprises:

an axis arranged centrally within the chamber, and scrapers attached to, and rotating on the centrally arranged axis between the cylindrical or semi-cylindrical disc-shaped hollow compartments, a first duct leading to the jacket of the dryer section for feeding steam under pressure from a steam boiler into the heat exchange elements of the dryer section, a second duct leading from the upper portion of the chamber to the jacket of the cooker section for feeding steam generated in the dryer section into the heat exchange elements of the cooker, wherein the cooker section is separated from the dryer section with a water tight panel attached to the interior of the chamber.

2. The combined cooker and dryer according to claim 1, wherein the chamber further comprises an intermittent section, between the cooker section and the dryer section.

3. The combined cooker and dryer according to claim 2, wherein the intermittent section is separated from the cooker section and the dryer section with a water tight panels attached to the interior of the chamber.

4. The combined cooker and dryer according to claim 3, wherein the chamber has an inlet (24) in the drying section for receiving material from a separation device.

5. The combined cooker and dryer according to claim 1, wherein a sensor monitors the amount of material in the dryer section by measuring the height or level of material in the dryer section.

6. The combined cooker and dryer according to claim 1, wherein a sensor monitors the amount of material in the dryer section by measuring the weight of material in the dryer section.

7. The combined cooker and dryer according to any of the preceding claims, wherein the dryer section has a first jacket and a second jacket parallel arranged around the chamber, and wherein the first jacket receives steam under pressure from a steam boiler, the apparatus further comprising:

a duct leading from the upper portion of the dryer section into the second jacket of the dryer section, and one or more high pressure fans in the duct between the upper portion of the dryer section and the second jacket of the dryer section for increasing the pressure and the temperature of the steam before injecting it into the second jacket of the dryer section.

* * * * *